Feb. 15, 1944.    F. M. CLARK    2,341,760
INSULATING AND DIELECTRIC COMPOSITION
Filed Feb. 25, 1942

Inventor:
Frank M. Clark,
by Harry E. Dunham
His Attorney.

Patented Feb. 15, 1944

2,341,760

UNITED STATES PATENT OFFICE 2,341,760

INSULATING AND DIELECTRIC COMPOSITION

Frank M. Clark, Pittsfield, Mass., assignor to General Electric Company, a corporation of New York Application February 25, 1942, Serial No. 432,271

10 Claims. (Cl. 252—65)

The present invention comprises compositions comprising halogenated diphenyl benzene and hydrogenated castor oil which have a combination of physical and chemical properties particularly adapting such compositions for the insulating and dielectric fields, and in particular as capacitor dielectric elements.

In United States Patent 2,041,594 are disclosed various dielectric compositions, included among which are halogen compounds of diphenyl benzene, which also is termed triphenyl. Although chlorinated diphenyl benzene has various advantages as a capacitor dielectric its power factor at commercial frequencies is higher than that of other halogenated aromatic compounds, such for example as chlorinated diphenyl and chlorinated diphenyl oxide. Capacitors impregnated with halogenated diphenyl benzene have a lower capacity than otherwise similar capacitors which contain other aromatic compounds containing corresponding amounts of halogen.

Hydrogenated castor oil, which is known also as Opal Wax, is a solid material melting at about 75° C. Capacitors impregnated with hydrogenated castor oil have been found to possess characteristics unsuited for commercial alternating current circuits. In particular, their power factor is high and unstable. Dielectric failures of such capacitors when operating at moderately high voltages, for example 400 to 500 volts, have resulted after as short a life as one week. Capacitors impregnated with hydrogenated castor oil undergo a sudden decrease of capacity at the melting point of hydrogenated castor oil which is an undesirable property.

I have discovered that compositions of chlorinated diphenyl benzene and hydrogenated castor oil unexpectedly have highly advantageous properties for the electric field, and particularly as capacitor dielectric elements.

Surprisingly, the power factor of mixtures comprising these compounds is lower than the power factor of either ingredient individually.

Figure 1:
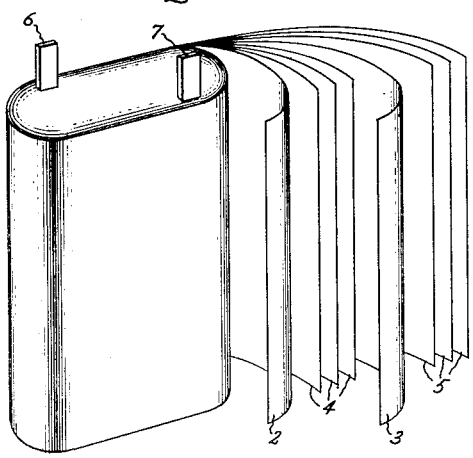
Figure 2:
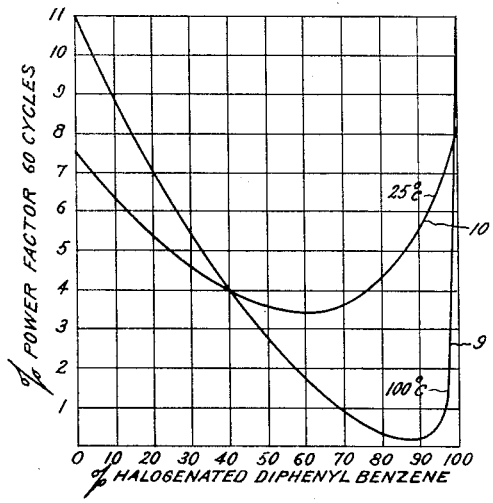
Figure 3:
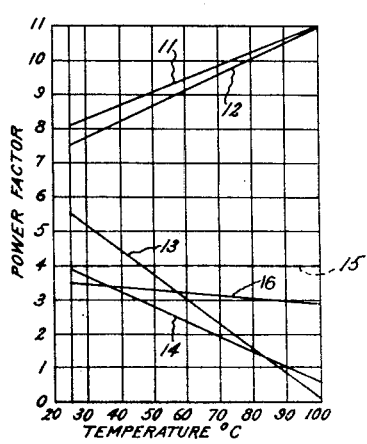

In the accompanying drawing, Fig. 1 is a somewhat conventionalized representation of an electric capacitor for which my new compositions may be employed as impregnants; Fig. 2 is a graph showing power factor characteristics of ranges of compositions embodying my invention; and Fig. 3 is a graph showing power factors over a range of temperature for various compositions comprising chlorinated diphenyl benzene and hydrogenated castor oil.

The capacitor shown in Fig. 1 is of a type which is in commercial use. It consists of armatures 2, 3, interposed insulating spacers 4, 5 and contact strips 6 and 7. Aluminum foil ordinarily is employed for use as armature material, but foil consisting of other metal, such as copper, tin or lead, likewise may be used. The spacers ordinarily consist of kraft capacitor paper having a thickness of about .0004 inch. Such paper is described in Allen Patent 1,850,702, patented March 22, 1932.

A capacitor of this type will be referred to hereinafter for comparison purposes. The dimensions of a comparison unit are chosen to be such that when it is impregnated with pentachlorinated diphenyl it has a capacity of 3 microfarads and a power factor at 100° C. of about 0.5 per cent. In order to illustrate the advantages of compositions embodying my present invention comprising as main ingredients halogenated diphenyl benzene and hydrogenated castor oil, I shall refer to such comparison capacitor.

In the past, capacitors have been operated to a large extent at ambient temperatures of approximately 25 to 50° C. In recent years it has been found desirable in many instances to operate capacitors within a range of ambient temperatures of about 80 to 100° C. and even higher temperatures. The high ambient temperature encountered in operations has been to a large extent due to the requirement that capacitors and associated electrical apparatus shall be mounted together in the smallest possible space. Consequently, the heat emitted by electrical apparatus, as for example a fluorescent lamp ballast equipment, or an electric motor, has resulted in high ambient temperatures for capacitors associated therewith. Efforts to improve capacitors by the utilization of materials for impregnation having encouragingly high dielectric constants have been generally unsuccessful because of high, and sometimes unstable, power factors.

Chlorinated diphenyl benzene, particularly in the forms containing relatively high percentages of chlorine, exhibits power factors too high for commercial use. Over most of the range of chlorination the chlorinated diphenyl benzene compounds are solids and when containing as high as about 50 to 60 per cent chlorine are introduced with difficulty as impregnants because of their high melting point and their high viscosity when melted.

As heretofore indicated, the addition of hydrogenated castor oil to chlorinated diphenyl benzene, even in such small amounts as a few per cent, produces an extraordinary lowering of power factor. On the other hand, favorable results are obtainable from compositions of halogenated diphenyl benzene and hydrogenated castor oil even when the latter ingredient greatly preponderates over the former. Advantageous characteristics are obtained in capacitors such as shown in Fig. 1 when impregnated with such compositions when the content of hydrogenated castor oil is within the range of about 3 to 60 parts and the range of chlorinated diphenyl benzene is about 97 to 40 parts, although these percentages are not to be considered as limiting. The most favorable characteristics are obtained with compositions containing roughly about 10 to 20 parts of hydrogenated castor oil and about 90 to 80 parts of chlorinated diphenyl benzene. The chlorine content of the latter ingredient in such composition may be within a range of about 14 to 60 per cent, although in general a range of chlorine content of about 52 to 60 per cent is preferred.

The graph constituting Fig. 2 illustrates the favorable depression of power factor obtained by the addition of hydrogenated castor oil to diphenyl benzene combined with about 60 per cent chlorine. Diphenyl benzene of this degree of chlorination is a glass-like, brittle solid having a pour point of about 93 to 95° C., and when melted is a liquid of very high viscosity. Even at 100° C., which is a temperature normally used for the impregnation of capacitors, its viscosity is 7500 seconds Saybolt Universal, which renders impregnation difficult and uncertain. Its dielectric constant at 50° C. is about 2.7 and at 100° C. is about 3.3.

Referring to Fig. 2, such chlorinated diphenyl benzene when unassociated with hydrogenated castor oil has at 100° C. a power factor of about 11 per cent, which is too high for commercial use. This value was obtained at a frequency of about 60 cycles and at an impressed potential of about 30 volts per mil. The addition of very small amounts of hydrogenated castor oil results in an abrupt depression of power factor and reduces the viscosity of the fused material.

Curve 9 shows the power factor characteristic at temperature of 100° C. Curve 10 shows the power factor characteristic at 25° C. The marked decrease of power factor between 25° and 100° C. is a decided advantage for high temperature operation of capacitors.

It will be observed that when the content of hydrogenated castor oil is as high as 10 per cent by weight, the power factor at 100° C. is about .2 per cent, which is extraordinarily low. When the content of the hydrogenated castor oil has risen as high as 60 per cent, the power factor at an operating temperature of 100° C. has increased only to 4 per cent. Over the entire range of compositions containing both halogenated diphenyl benzene and hydrogenated castor oil the power factor is improved by virtue of the presence of the hydrogenated castor oil, even though the latter by itself has a poor power factor characteristic.

As will be observed from Fig. 3, the power factors of chlorinated diphenyl benzene (60 per cent chlorine) graph 11, and of hydrogenated castor oil, graph 12, at commercial frequencies rise from 25° C. (room temperature) to about 100° C. The initial values are high, being about 7.5 per cent for hydrogenated castor oil, and about 8 per cent for chlorinated diphenyl benzene. At 100° C. each of these materials has a power factor close to 11 per cent.

A composition containing about 90 parts of the chlorinated diphenyl benzene and 10 parts of hydrogenated castor oil is characterized by power factors over this range of temperature, as shown by graph 13, varying from about 5.5 per cent at 25° C. to about .2 per cent at 100° C. Proportions of 75 parts of the former and 25 parts of the latter have power factors as indicated by the graph 14. The power factor of a composition containing about 40 per cent of chlorinated diphenyl benzene and 60 per cent of hydrogenated castor oil, as shown by curve 15, is substantially constant over this range. A composition containing substantially equal parts of these two ingredients, as shown by the curve 16, decreases in power factor from about 3.5 per cent to about 2.8 per cent.

A comparison unit as previously described impregnated with a composition consisting by weight of 75 parts of hydrogenated castor oil and 25 parts of chlorinated diphenyl benzene (60 per cent chlorine) has a capacity of 3.92 microfarads. This is an increase of about 30 per cent over the chlorinated diphenyl-treated capacitor. A comparison unit impregnated with a composition consisting of about 10 per cent hydrogenated castor oil and 30 per cent chlorinated diphenyl benzene (60 per cent chlorine) has a capacity of about 3.35 microfarads, which is an increase of about 12 per cent. This high capacity is obtained without any substantial sacrifice of power factor. Such units after operation on test about one year at an ambient temperature of about 70° C. showed no loss of capacity or other dielectric deterioration.

Capacitors impregnated with chlorinated diphenyl benzene (60% chlorine) and hydrogenated castor oil alone have power factors at 75° C. of 1.5 per cent and 2.0 per cent, respectively, on commercial frequencies. These high power factors render such capacitors unsuited for high temperature operation. The addition of even three parts of hydrogenated castor oil to 97 parts of the chlorinated diphenyl benzene results in a lowering of the power factor to about 0.3 to 0.5 per cent at temperatures as high as 100° C. on circuits operating with commercial frequencies.

In some cases other materials may be added to compositions embodying halogenated diphenyl benzene and opal wax as essential ingredients. Tetrachlor benzene, and in particular the 1,2,4,5 isomer, may be added as an additional ingredient. Chlorinated naphthalene, preferably tetrachlor naphthalene, and highly chlorinated compounds of diphenyl, diphenyl oxide and diphenylene oxide may be added in various combinations.

Although the advantages of compositions embodying my invention have been described with particular application to capacitors, these compositions which mainly are waxy solids, have advantages in the insulating field, as for example, in bushings, cables, potheads, and so forth.

What I claim as new and desire to secure by Letters Patent of the United States is:

1. Compositions suitable for dielectric and insulating purposes comprising as essential and substantial ingredients about 97 to 40 parts of halogenated diphenyl benzene and about 3 to 60 parts of hydrogenated castor oil.

2. Compositions of matter comprising as essential ingredients chlorinated diphenyl benzene containing combined chlorine within a range of 14 to 60 per cent, said compositions containing at least about three per cent by weight of hydrogenated castor oil.

3. Compositions suitable for dielectric and insulating purposes comprising by weight about 60 parts of hydrogenated castor oil and about 40 parts of chlorinated diphenyl benzene having a chlorine content of about 52 to 60 per cent.

4. Normally solid dielectric compositions comprising as essential and substantial ingredients about 90 to 80 parts of chlorinated diphenyl benzene and about 10 to 20 parts of hydrogenated castor oil.

5. Compositions suitable for dielectric and insulating purposes comprising essentially by weight about 3 to 60 parts of hydrogenated castor oil and about 97 to 40 parts of chlorinated diphenyl benzene, the latter containing about 60 per cent of combined chlorine.

6. A capacitor dielectric composition comprising by weight about 70 to 97 parts of chlorinated diphenyl benzene containing about 60 per cent of combined chlorine, also about 30 to 3 parts of hydrogenated castor oil and another chlorinated aromatic compound miscible with said ingredients.

7. Compositions suitable for dielectric and insulating purposes comprising essentially by weight about 3 to 60 parts of hydrogenated castor oil and about 97 to 40 parts of chlorinated diphenyl benzene.

8. A capacitor dielectric composition comprising the combination by weight of about 90 to 80 parts of chlorinated diphenyl benzene containing about 52 to 60 per cent of chlorine, about 10 to 20 parts of hydrogenated castor oil and a chlorinated phenyl compound miscible with said ingredients.

9. A dielectric composition consisting essentially by weight of about 90 parts of chlorinated diphenyl which contains about 14 to 60 per cent chlorine, and about 10 parts of hydrogenated castor oil.

10. A dielectric composition consisting essentially of about 3 to 60 parts of hydrogenated castor oil, about 97 to 40 parts of chlorinated diphenyl benzene which contains about 52 to 60 per cent chlorine, and tetrachlorbenzene.

FRANK M. CLARK.